United States Patent
Yoo

(10) Patent No.: US 10,728,232 B2
(45) Date of Patent: Jul. 28, 2020

(54) METHOD FOR AUTHENTICATING CLIENT SYSTEM, CLIENT DEVICE, AND AUTHENTICATION SERVER

(71) Applicant: SAMSUNG SDS CO., LTD., Seoul (KR)

(72) Inventor: In-Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 185 days.

(21) Appl. No.: 15/643,834

(22) Filed: Jul. 7, 2017

(65) Prior Publication Data

US 2018/0013738 A1 Jan. 11, 2018

(30) Foreign Application Priority Data

Jul. 7, 2016 (KR) .................. 10-2016-0086125

(51) Int. Cl.
| | | |
|---|---|---|
| H04L 29/06 | (2006.01) | |
| H04L 9/08 | (2006.01) | |
| H04L 9/32 | (2006.01) | |

(52) U.S. Cl.
CPC .......... *H04L 63/061* (2013.01); *H04L 9/0822* (2013.01); *H04L 9/3247* (2013.01); *H04L 63/0807* (2013.01); *H04L 63/0853* (2013.01); *H04L 63/10* (2013.01); *H04L 63/123* (2013.01); *H04L 2209/42* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,871,278 B1* | 3/2005 | Sciupac | ............... | H04L 63/126 713/185 |
| 7,305,705 B2* | 12/2007 | Shelest | ............... | H04L 63/0272 713/156 |
| 7,870,103 B1* | 1/2011 | Maheshwari | ....... | G06F 16/9014 707/687 |
| 7,882,356 B2* | 2/2011 | Klemets | ............. | H04L 63/0823 713/168 |
| 8,452,956 B1* | 5/2013 | Kersey | ............... | H04L 63/0428 713/153 |
| 9,640,001 B1* | 5/2017 | Vazquez | ............... | H04L 63/107 |
| 2003/0115453 A1* | 6/2003 | Grawrock | ............... | G06F 21/57 713/155 |
| 2004/0255037 A1* | 12/2004 | Corvari | ............... | H04L 63/0823 709/229 |
| 2006/0077908 A1* | 4/2006 | Park | .................. | H04L 29/12216 370/254 |

(Continued)

*Primary Examiner* — Ali S Abyaneh
*Assistant Examiner* — Shu Chun Gao
(74) *Attorney, Agent, or Firm* — Sughrue Mion, PLLC

(57) ABSTRACT

Provided are a client system authentication method, a client device, and an authentication server. The client system authentication method includes acquiring a shared key to be shared between a client system and an authentication server in cooperation with the authentication server, generating a virtual address of the client system using identification information of the client system and the shared key, transmitting registration request information including the virtual address to the authentication server, and receiving an authentication key for the client system from the authentication server.

24 Claims, 12 Drawing Sheets

(56) References Cited

U.S. PATENT DOCUMENTS

| | | | |
|---|---|---|---|
| 2006/0104252 A1* | 5/2006 | Song | H04L 63/0272 370/338 |
| 2006/0224470 A1* | 10/2006 | Garcia Ruano | G06Q 20/322 705/26.1 |
| 2009/0240874 A1* | 9/2009 | Pong | G06F 12/0223 711/105 |
| 2011/0066841 A1* | 3/2011 | Goodrow | H04L 43/0894 713/150 |
| 2013/0268444 A1* | 10/2013 | Namgoong | G06Q 20/40145 705/71 |
| 2015/0244710 A1* | 8/2015 | Koster | G06F 21/44 713/171 |
| 2016/0080337 A1* | 3/2016 | Pahl | H04L 9/085 713/171 |
| 2016/0364343 A1* | 12/2016 | Case | G09C 1/00 |
| 2017/0279781 A1* | 9/2017 | Lie, Jr. | H04L 9/3234 |

* cited by examiner

METHOD FOR AUTHENTICATING CLIENT SYSTEM, CLIENT DEVICE, AND AUTHENTICATION SERVER

CROSS-REFERENCE TO RELATED APPLICATION

This application claims priority to and the benefit of Korean Patent Application No. 10-2016-0086125, filed on Jul. 7, 2016, the disclosure of which is incorporated herein by reference in its entirety.

BACKGROUND

1. Field

Embodiments of the present disclosure relate to technology for authenticating a client system.

2. Discussion of Related Art

According to a related art, in order to authenticate an application server, a key is used through hardware equipment, or a fixed Internet protocol (IP) address is used.

In a public cloud environment, an IP address and a domain name are assigned by software defined networking (SDN). Therefore, every time a virtual machine (VM) instance is run, an IP address and a domain name are changed, and it is difficult to use an IP address and a domain name to authenticate an application server.

Meanwhile, it is necessary to dynamically increase and authenticate application servers for a software as a service (SaaS) service. However, when the application servers are authenticated using IP addresses, scale-out may not be dynamically achieved until the IP addresses are registered.

SUMMARY

Exemplary embodiments of the present disclosure are directed to providing a client system authentication method, a client device, and an authentication server.

According to an aspect of the present disclosure, there is provided a client system authentication method including: acquiring a shared key to be shared between a client system and an authentication server in cooperation with the authentication server; generating a virtual address of the client system using identification information of the client system and the shared key; transmitting registration request information including the virtual address to the authentication server; and receiving an authentication key for the client system from the authentication server.

The identification information may include at least one of a code of the client system, a domain name assigned to the client system, and an Internet protocol (IP) address assigned to the client system.

The authentication key may be generated using the registration request information.

The client system authentication method may further include, when the authentication key is received, requesting information required for a service or a function performed by the client system by transmitting the virtual address to the authentication server.

The client system authentication method may further include requesting authentication of the client system by transmitting the authentication key and authentication request information including at least one of the virtual address and the identification information to the authentication server.

The requesting of the authentication may include: generating an electronic signature for the authentication key; and requesting the authentication of the client system by providing the authentication key, the electronic signature, and the authentication request information including the at least one of the virtual address and the identification information to the authentication server.

The client system authentication method may further include: receiving an authentication result corresponding to the authentication request from the authentication server; and when the authentication of the client system has succeeded, requesting information required for a service or a function performed by the client system by transmitting the virtual address to the authentication server.

According to another aspect of the present disclosure, there is provided a client system authentication method including: generating or providing a shared key to be shared between a client system installed in a client device and an authentication server in cooperation with the client device; receiving registration request information including a virtual address of the client system generated using identification information of the client system and the shared key from the client device; generating an authentication key for the client system using the registration request information; storing the registration request information as authentication information of the client system in connection with the authentication key; and providing the authentication key to the client device.

The identification information may include at least one of a code of the client system, a domain name assigned to the client system and an IP address assigned to the client system.

The client system authentication method may further include: after the providing of the authentication key, receiving a virtual address and a request for information required for a service or a function performed by the client system from the client device; determining whether the received virtual address and the virtual address stored as the authentication information are identical by comparing the received virtual address and the stored virtual address; and when the received virtual address and the stored virtual address are identical, providing the requested information to the client device.

The client system authentication method may further include: receiving the authentication key and authentication request information including at least one of the virtual address and the identification information from the client device; authenticating the client system by comparing the received authentication request information and authentication key with the stored authentication information and authentication key; and providing a result of the authentication to the client device.

The client system authentication method may further include: receiving the authentication key, an electronic signature for the authentication key, and authentication request information including at least one of the virtual address and the identification information from the client device; generating an electronic signature using the stored authentication information and authentication key; verifying the received electronic signature by comparing the received electronic signature and the generated electronic signature and authenticating the client system by comparing the received authentication request information and authentication key with the stored authentication information and authentication key; and providing a result of the authentication to the client device.

The client system authentication method may further include: when the authentication of the client system has succeeded, receiving a virtual address and a request for information required for a service or a function performed by the client system; determining whether the received virtual address and the virtual address stored as the authentication information are identical by comparing the received virtual address and the stored virtual address; and when the received virtual address and the stored virtual address are identical, providing the requested information to the client device.

According to another aspect of the present disclosure, there is provided a client device including: a shared key acquirer configured to acquire a shared key to be shared between a client system and an authentication server in cooperation with the authentication server; a virtual address generator configured to generate a virtual address of the client system using identification information of the client system and the shared key; an authentication requester configured to transmit registration request information including the virtual address to the authentication server and receive an authentication key for the client system from the authentication server; and a storage configured to store the virtual address and the authentication key.

The identification information may include at least one of a code of the client system, a domain name assigned to the client system and an IP address assigned to the client system.

The authentication key may be generated using the registration request information.

When the authentication key is received, the authentication requester may request information required for a service or a function performed by the client system by transmitting the virtual address to the authentication server.

The authentication requester may request that the client system be authenticated by transmitting the authentication key and authentication request information including at least one of the virtual address and the identification information to the authentication server.

The authentication requester may generate an electronic signature for the authentication key and request that the client system be authenticated by providing the authentication key, the electronic signature, and the authentication request information including the at least one of the virtual address and the identification information to the authentication server.

The authentication requester may receive an authentication result corresponding to the authentication request from the authentication server and request information required for a service or a function performed by the client system by transmitting the virtual address to the authentication server when the authentication of the client system has succeeded.

According to another aspect of the present disclosure, there is provided an authentication server including: a session key generator configured to generate or provide a shared key to be shared with a client system installed in a client device in cooperation with the client device; an authentication key generator configured to receive registration request information including a virtual address of the client system generated using identification information of the client system and the shared key from the client device, generate an authentication key for the client system using the registration request information, and provide the authentication key to the client device; and a storage configured to store the registration request information as authentication information of the client system in connection with the authentication key.

The identification information may include at least one of a code of the client system, a domain name assigned to the client system and an IP address assigned to the client system.

The authentication server may further include an authenticator configured to receive the authentication key and authentication request information including at least one of the virtual address and the identification information from the client device and authenticate the client system by comparing the received authentication request information and authentication key with the stored authentication information and authentication key.

The authenticator may receive the authentication key, an electronic signature for the authentication key, and the authentication request information including the at least one of the virtual address and the identification information from the client device, generate an electronic signature using the stored authentication information and authentication key, verify the received electronic signature by comparing the received electronic signature and the generated electronic signature, and authenticate the client system by comparing the received authentication request information and authentication key with the stored authentication information and authentication key.

After the authentication key is provided, the authenticator may receive a virtual address and a request for information required for a service or a function performed by the client system from the client device, determine whether the received virtual address and the virtual address stored as the authentication information are identical by comparing the received virtual address and the stored virtual address, and provide the requested information to the client device when the received virtual address and the stored virtual address are identical.

After the authentication succeeds, the authenticator may receive a virtual address and a request for information required for a service or a function performed by the client system, determine whether the received virtual address and the virtual address stored as the authentication information are identical by comparing the received virtual address and the stored virtual address, and provide the requested information to the client device when the received virtual address and the stored virtual address are identical.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings. The following description is provided to facilitate a comprehensive understanding of a method, an apparatus, and/or a system disclosed herein. However, the description is just exemplary, and the present disclosure is not limited thereto.

While describing the present disclosure, when it is determined that a detailed description of a known art related to the present disclosure may obscure the gist of the present disclosure, the detailed description will be omitted. Terms which will be described below are defined in consideration of functionality in the present disclosure, which may vary according to an intention of a user or an operator or a usual practice. Therefore, a definition thereof should be made on the basis of the overall content of the specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," or "including," when used herein, specify the presence of stated features, numerals, steps, operations, elements, or combinations thereof, but do not preclude the presence or addition of one or more other features, numerals, steps, operations, elements, or combinations thereof.

Figure 1:
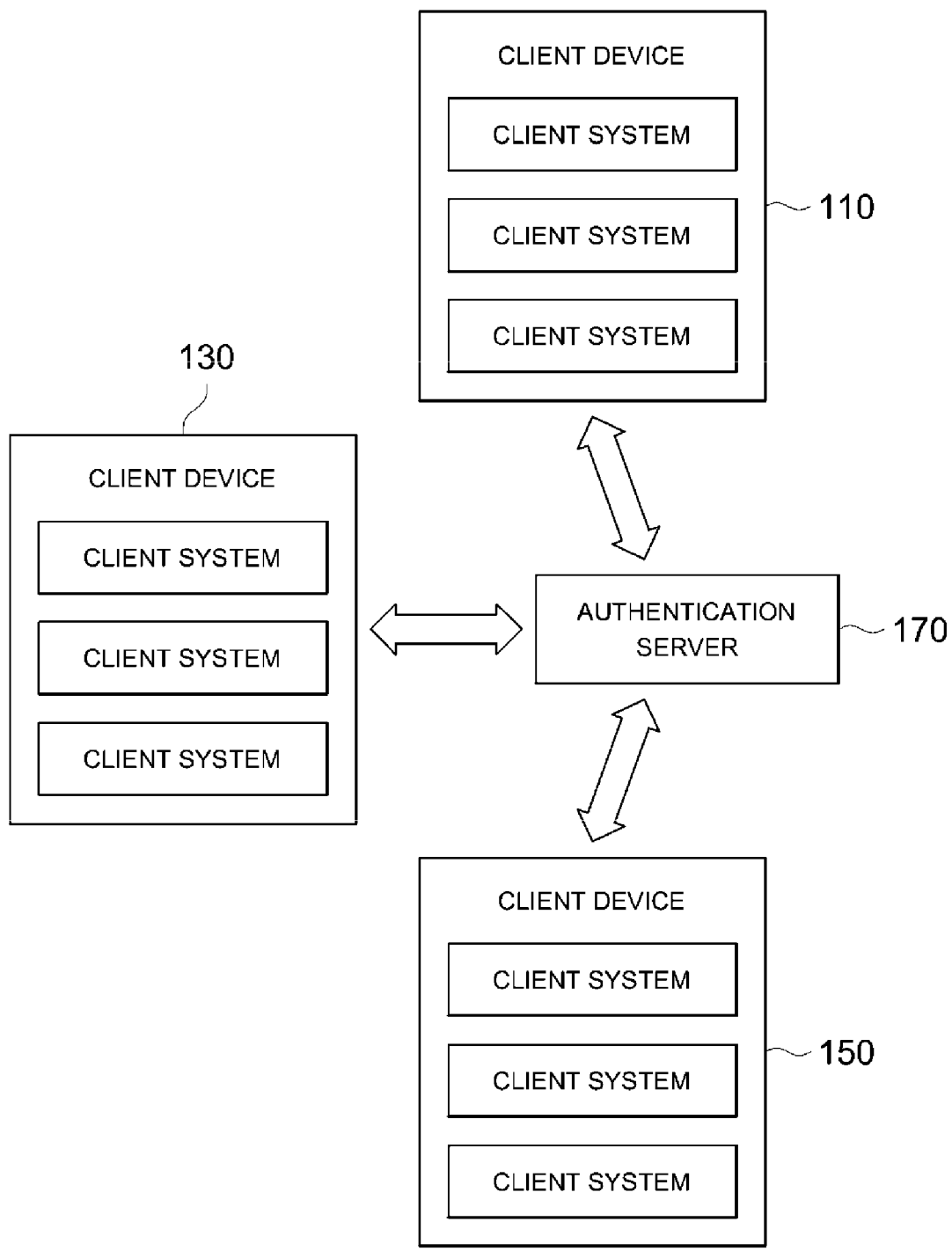
FIG. 1 is a block diagram of an authentication system according to an exemplary embodiment of the present disclosure.

FIG. 1 is a block diagram of an authentication system according to an exemplary embodiment of the present disclosure.

Referring to FIG. 1, an authentication system 100 according to an exemplary embodiment of the present disclosure may include one or more client devices 110, 130, and 150 and an authentication server 170.

One or more client systems may be installed in each of the client devices 110, 130, and 150.

The client systems may represent applications, application servers (e.g., web application servers), firmware, and the like for providing specific functions or services to the client devices 110, 130, and 150 or external devices connected to the client devices 110, 130, and 150 via a network using information provided through authentication by the authentication server 170.

As a detailed example, each of the client systems may call an application programming interface (API) provided by the authentication server 170 and authenticate the authentication server 170 to provide a specific function or service.

According to an exemplary embodiment of the present disclosure, the client devices 110, 130, and 150 and the authentication server 170 may be physical servers that provide a cloud service, for example, software as a service (SaaS).

In this case, the client systems may be, for example, application servers (e.g., web application servers) installed in virtual machines (VMs) of the client devices 110, 130, and 150. Here, one or more identical or different client systems may be installed in each VM, and one or more client systems installed in the same VM have the same Internet protocol (IP) address.

Meanwhile, different types of client systems installed in the same VM may be distinguished from each other using domain names, protocols, ports, or the like of the client systems when accessed from the outside.

The same type of client systems installed in the same VM have the same public IP address and the same domain name, and may be accessed from the outside by assigning different ports to the client systems according to protocols. However, since client systems installed in different VMs may use the same port, it is not possible to distinguish the client systems installed in different VMs and authenticate the client systems.

Therefore, the authentication server 170 requires information for identifying each client system to separately authenticate the same type of client systems installed in the same VM.

As another example, the client systems may be application servers that are installed in VMs of the client devices 110, 130, and 150 in the form of docker images using dockers or containers.

In this case, one or more client systems having the same domain name may be installed in each VM in the form of docker images, and each of the client systems has a variable IP address.

Therefore, the authentication server 170 requires identification information for distinguishing client systems to authenticate client systems having the same domain name.

Meanwhile, according to another exemplary embodiment of the present disclosure, each of the client devices 110, 130, and 150 may be a terminal (e.g., a smart phone, a laptop personal computer (PC), a desktop PC, a tablet PC, a hub, a television, a printer, or the like) in an Internet of things (IoT) environment in which one or more client systems are installed. In this case, the client systems may be, for example, applications, firmware, or the like that are installed in each of the client devices 110, 130, and 150 and perform specific functions.

Also, the authentication server 170 may be a server that authenticates the client systems installed in the client devices 110, 130, and 150 and provides information required for a corresponding client system to perform a specific function.

In this case, one or more applications installed in each of the client devices 110, 130, and 150 have the same IP address and the same domain name. Therefore, to authenticate client systems installed in the same client device 110, 130, or 150, the authentication server 170 requires identification information for distinguishing the client systems.

Since the above-described examples of the authentication system 100 are exemplary, the authentication system 100 according to an exemplary embodiment of the present disclosure is not limited thereto. Regardless of form and name, the authentication system 100 may be any system in which one or more client systems installed in a specific device require authentication of an external device connected via a network on the basis of information provided by the external device to provide a specific function or service.

Figure 2:
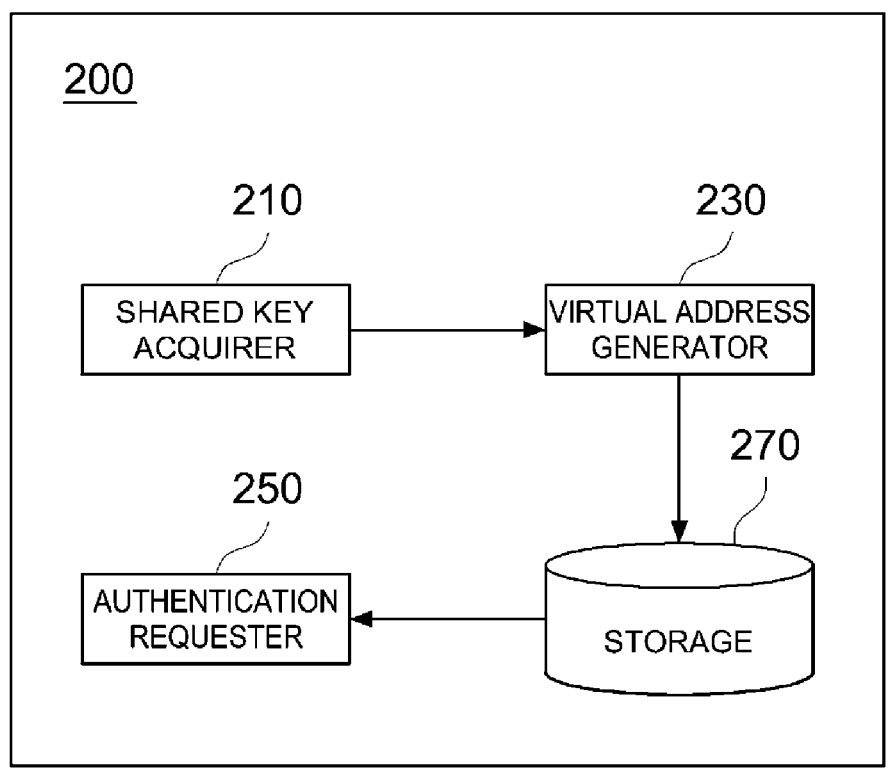
FIG. 2 is a block diagram of a client device according to an exemplary embodiment of the present disclosure.

FIG. 2 is a block diagram of a client device 200 according to an exemplary embodiment of the present disclosure.

The client device 200 according to an exemplary embodiment of the present disclosure includes a shared key acquirer 210, a virtual address generator 230, an authentication requester 250, and a storage 270.

The client device 200 shown in FIG. 2 corresponds to the client devices 110, 130, and 150 shown in FIG. 1.

The shared key acquirer 210 acquires a shared key for generating a virtual address of a client system in cooperation with the authentication server 170.

Specifically, according to an exemplary embodiment of the present disclosure, the shared key acquirer 210 may request a shared key from the authentication server 170, exchange seed values with the authentication server 170, and generate the same shared key as the authentication server 170 using the exchanged seed values.

At this time, for example, a Diffie-Hellman key exchange may be used to exchange the seed values and generate the shared key. In addition to the Diffie-Hellman key exchange, it is possible to use any method which enables both sides to exchange seed values and then generate the same final value instead of transmitting and receiving the final value.

As a detailed example, the shared key acquirer 210 may exchange seed values with the authentication server 170 in every communication session between a client system and the authentication server 170 and generate the same session key as the authentication server 170 using the exchanged seed values. In this case, a shared key for generating a virtual address of a client system may be a session key generated in an initial communication session between the client system and the authentication server 170.

Here, the initial communication session denotes a communication session in which the client system is registered with the authentication server 170, and is hereafter interpreted as having the same meaning thereas.

According to another exemplary embodiment of the present disclosure, the shared key acquirer 210 may request a shared key from the authentication server 170 and receive a shared key generated by the authentication server 170.

For example, the shared key acquirer 210 may request and receive a public key of the authentication server 170 from the authentication server 170 and use the public key received from the authentication server 170 as the shared key for generating a virtual address of a client system.

Here, the public key may be a public key used in an asymmetric-key cryptographic algorithm, for example, the Rivest-Shamir-Adleman (RSA) cryptographic algorithm, the ElGamal cryptographic algorithm, an elliptic curve cryptographic algorithm, and the like.

Meanwhile, the shared key for generating a virtual address of a client system is not limited to the aforementioned examples, and any information that is shared between a client system and the authentication server 170 besides the aforementioned examples may be used as the shared key for generating a virtual address of a client system.

The virtual address generator 230 generates a virtual address of the client system using identification information of the client system and the shared key acquired by the shared key acquirer 210.

Here, the identification information of the client system may include at least one of a code of the client system, a domain name assigned to the client system and an IP address assigned to the client system.

Also, the code of the client system may be a name indicating a function or a service provided by the client system, for example, "service web portal," "API gateway," or the like. However, the code of the client system is not limited to the aforementioned name and may include various names for identifying the client system instead of the aforementioned name.

Meanwhile, the identification information of the client system is not limited to the aforementioned examples and may include various pieces of identification information assigned to the client system instead of the aforementioned examples.

Figure 3:
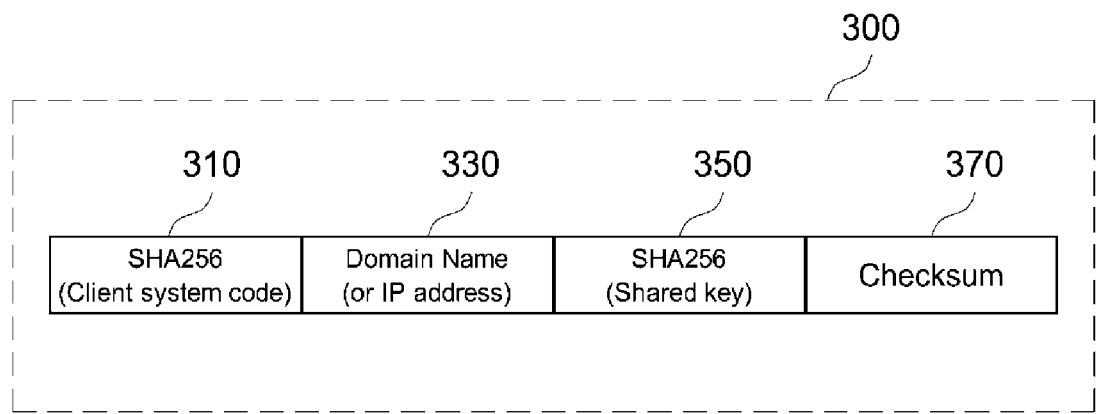
FIG. 3 is an example diagram of a virtual address.

FIG. 3 is an example diagram of a virtual address generated by the virtual address generator 230.

Referring to FIG. 3, the virtual address generator 230 may generate a hash value 350 of the shared key acquired by the shared key acquirer 210 by applying a hash algorithm (secure hash algorithm (SHA)-256) to the shared key.

Also, the virtual address generator 230 may generate a hash value 310 of the code of the client system by applying the hash algorithm (SHA-256) to the code of the client system.

Subsequently, the virtual address generator 230 may generate a checksum value 370 of the hash value 350 of the shared key, the hash value 310 of the code of the client system, and a domain name (or an IP address) 330 assigned to the client system.

Subsequently, the virtual address generator 230 may generate a virtual address 300 by combining the hash value 310 of the code of the client system, the domain name (or the IP address) 330 assigned to the client system, the hash value 350 of the shared key, and the checksum value 370.

Here, according to an exemplary embodiment, a process of converting a binary value of the generated virtual address 300 into text may be added.

Meanwhile, the virtual address 300 shown in FIG. 3 is exemplary, and the virtual address 300 generated by the virtual address generator 230 is not necessarily generated according to the illustrated example.

For example, in the example shown in FIG. 3, the code and the domain name (or the IP address) of the client system are used as identification information of the client system to generate the virtual address 300. However, the identification information is not limited thereto, and various pieces of identification information assigned to the client system may be used instead of the identification information mentioned above as an example.

In addition to the hash algorithm (i.e., SHA-256) used in the example shown in FIG. 3, various known hash algorithms may be used to generate the virtual address 300, and any algorithm other than the hash algorithm may also be used as long as it is possible to generate a value for uniquely identifying the client system using the shared key and identification information of the client system.

Referring back to FIG. 2, the authentication requester 250 performs registration and authentication of the client system through the authentication server 170.

According to an exemplary embodiment of the present disclosure, in an initial communication session, the authentication requester 250 transmits registration request information including the virtual address generated by the virtual address generator 230 to the authentication server 170 and receives an authentication key for the client system from the authentication server 170.

Here, the authentication requester 250 may encrypt the registration request information using the session key generated in the initial communication session and then transmit the encrypted registration request information.

Also, the authentication key may be encrypted by the authentication server 170 using the session key. In this case, the authentication requester 250 may decrypt the encrypted authentication key using the session key.

Here, according to an exemplary embodiment, the session key may be identical to the shared key.

According to an exemplary embodiment of the present disclosure, the registration request information may include identification information of the client system as well as the virtual address.

The authentication key received from the authentication server 170 may be generated by the authentication server 170 using registration request data provided to the authentication server 170. This will be described in detail below.

Meanwhile, in every communication session between the client system and the authentication server 170 after the initial communication session, the authentication requester 250 requests that the client system be authenticated by transmitting the authentication key received from the authentication server 170 and authentication request information including at least one of the virtual address and identification information of the client system to the authentication server 170.

Here, the identification information of the client system included in the authentication request information may be the identification information that is transmitted as the registration request information.

For example, when the authentication requester 250 transmits registration request information including the virtual address and the code of the client system and receives the authentication key from the authentication server 170, the authentication requester 250 may transmit authentication request information including at least one of the virtual address and the code of the client system to the authentication server 170 in each communication session after the initial communication session.

Here, the authentication requester 250 may encrypt the authentication request information and the authentication key using a session key generated in each of the communication sessions after the initial communication session and then transmit the encrypted authentication request information and the encrypted authentication key to the authentication server 170.

Meanwhile, according to an exemplary embodiment of the present disclosure, the authentication requester 250 may generate an electronic signature for the authentication key and request authentication of the client system by transmitting the generated electronic signature to the authentication server 170 together with the authentication request information and the authentication key.

Here, the electronic signature may be generated using, for example, at least one of the authentication key, the virtual address, a session key of a current communication session, and the identification information of the client system that is provided to the authentication server 170.

As an example, the authentication requester 250 may generate the electronic signature for the authentication key according to the following method:

1) StringtoSign=authentication key+"n"+virtual address
2) Signature=Base64(HMAC-SHA256(session key, UTF-8-Encoding of(StringtoSign)))

Here, the session key denotes a session key generated in each of the communication sessions after the initial communication session.

The electronic signature generated by the authentication requester 250 is not necessarily limited to the aforementioned example, and the authentication requester 250 may generate an electronic signature in various known ways instead of the aforementioned example.

In the aforementioned example, the electronic signature is generated using the authentication key, the virtual address, and a session key, but various pieces of information on the client system shared with the authentication server 170 besides the authentication key, the virtual address, and the session key may be used to generate the electronic signature.

Meanwhile, when registration or authentication of the client system succeeds in each of the communication sessions, the authentication requester 250 may request information required for a function or a service performed by the client system by transmitting the virtual address to the authentication server 170.

For example, when calling an API provided by the authentication server 170, the authentication requester 250 may transmit the virtual address to the authentication server 170 and receive an API response from the authentication server 170.

The storage 270 stores the virtual address generated by the virtual address generator 230 and the authentication key received from the authentication server 170.

In an exemplary embodiment of the present disclosure, the shared key acquirer 210, the virtual address generator 230, the authentication requester 250, and the storage 270 may be implemented by a computing device including at least one processor and a computer-readable recording medium connected to the processor. The computer-readable recording medium may be inside or outside the processor and connected to the processor using various well-known means. The processor in the computing device may enable the computing device to operate according to an exemplary embodiment described in this specification. For example, the processor may execute an instruction stored in the computer-readable recording medium, and the instruction stored in the computer-readable recording medium may be configured to cause the computing device to perform operations according to the exemplary embodiment described in this specification when the instruction is executed by the processor.

Figure 4:
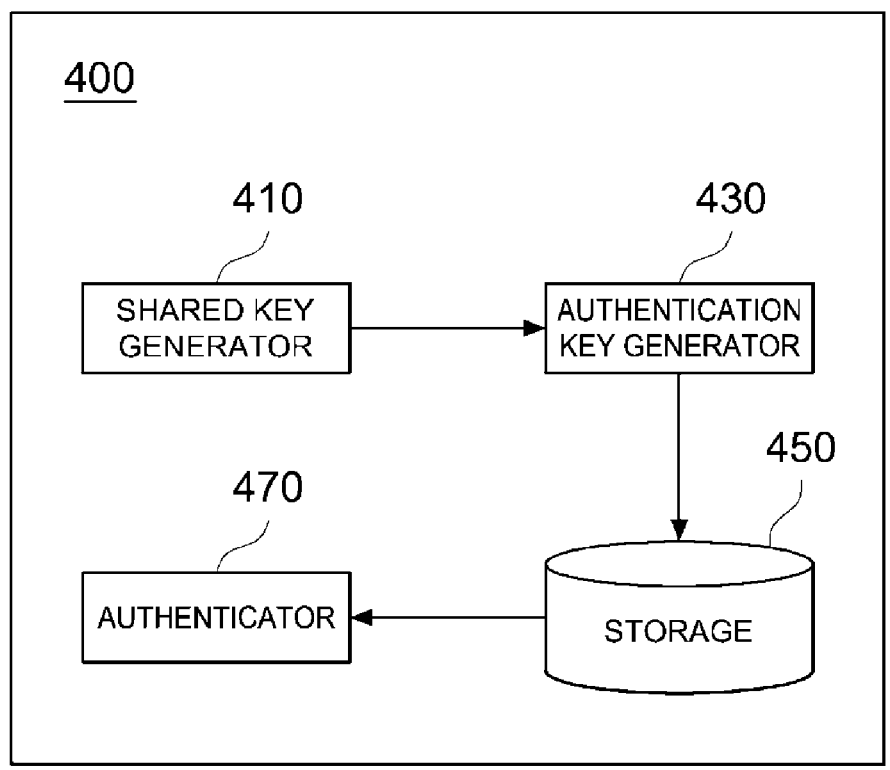
FIG. 4 is a block diagram of an authentication server according to an exemplary embodiment of the present disclosure.

FIG. 4 is a block diagram of an authentication server according to an exemplary embodiment of the present disclosure.

Referring to FIG. 4, an authentication server 400 according to an exemplary embodiment of the present disclosure includes a shared key generator 410, an authentication key generator 430, a storage 450, and an authenticator 470.

The authentication server 400 shown in FIG. 4 corresponds to, for example, the authentication server 170 shown in FIG. 1.

The shared key generator 410 generates or provides a shared key for generating a virtual address of a client system installed in the client device 110, 130, or 150 in cooperation with the client device 110, 130, or 150.

Specifically, according to an exemplary embodiment of the present disclosure, the shared key generator 410 may receive a shared key request from the client device 110, 130, or 150, exchange seed values with the client device 110, 130, or 150, and generate the same shared key as the client device 110, 130, or 150 using the exchanged seed values.

At this time, for example, a Diffie-Hellman key exchange may be used to exchange the seed values and generate the shared key. In addition to the Diffie-Hellman key exchange, it is possible to use any method which enables both sides to exchange seed values and then generate the same final value instead of transmitting and receiving the final value.

As a detailed example, the shared key generator 410 may exchange seed values with the client device 110, 130, or 150 in every communication session with the client system and generate the same session key as the client device 110, 130, or 150 using the exchanged seed values. In this case, the shared key for generating a virtual address of a client system may be a session key generated in an initial communication session between the client system and the authentication server 170.

According to another exemplary embodiment of the present disclosure, the shared key generator 410 may receive a shared key request from the client device 110, 130, or 150, generate a public key and a private key, and provide the generated public key to the client device 110, 130, or 150 as a shared key.

Here, the public key and the private key may be a public key and a private key used in an asymmetric-key cryptographic algorithm, for example, the RSA cryptographic algorithm, the ElGamal cryptographic algorithm, an elliptic curve cryptographic algorithm, and the like.

Meanwhile, the shared key for generating a virtual address of a client system is not limited to the aforementioned examples, and any information that is shared between a client system and the authentication server 400 may be used as the shared key for generating a virtual address of the client system instead of the aforementioned examples.

The authentication key generator 430 receives registration request information including a virtual address of the client system in the initial communication session with the client system and generates an authentication key for the client system using the received registration request information.

According to an exemplary embodiment, the registration request information may further include identification information of the client system.

Also, the registration request information may be encrypted using the session key generated in the initial communication session with the client system. In this case, the authentication key generator 430 may decrypt the received registration request information using the session key, and use the decrypted registration request information to generate the authentication key.

As an example, the authentication key generator 430 may generate the authentication key for the client system according to the following method:
1) enc_key=SHA2(Publish Date+random number)
2) AuthKey=client system Code+enc_key
3) authentication key=AES256(AuthKey) using enc_key In the aforementioned example, "Publish Date" denotes a generation date of the authentication key.

Meanwhile, an authentication key generation method performed by the authentication key generator 430 is not necessarily limited to the aforementioned example, and the authentication key generator 430 may generate the authentication key in various ways instead of the aforementioned example.

In the aforementioned example, a received code of the client system and the generation date of the authentication key are used as the registration request information to generate the authentication key, but information for generating the authentication key is not necessarily limited to the aforementioned example. For example, to generate the authentication key, the authentication key generator 430 may use the virtual address of the client system instead of the code of the client system or use both the code and the virtual address of the client system.

The storage 450 may store the received registration request information as authentication information of the client system in connection with the authentication key.

In each communication session after the initial communication session with the client system, the authenticator 470 receives an authentication key and authentication request information including at least one of a virtual address and identification information of the client system and authenticates the client system by comparing the received authentication request information and authentication key with authentication information of the client system and an authentication key stored in the storage 450.

For example, when a virtual address is included in the received authentication request information, the authenticator 470 may authenticate the client system by determining whether the received virtual address and the authentication key coincide with a virtual address and an authentication key stored in the storage 450 in connection with each other.

In another example, when a code of the client system is included in the received authentication request information, the authenticator 470 may authenticate the client system by determining whether the received code of the client system and the authentication key coincide with a code of the client system and an authentication key stored in the storage 450 in connection with each other.

Meanwhile, according to an exemplary embodiment of the present disclosure, the authenticator 470 may receive the authentication request information, the authentication key, and an electronic signature for the authentication key in every communication session after the initial communication session.

In this case, the authenticator 470 may determine whether the received authentication request information and authentication key coincide with authentication information of the client system and an authentication key stored in the storage 450 in connection with each other by comparing them.

Also, the authenticator 470 may generate an electronic signature using the authentication information of the client system and the authentication key stored in the storage 450, and verify the received electronic signature by comparing the generated electronic signature with the received electronic signature.

Here, the electronic signature generated by the authenticator 470 and the received electronic signature are generated using the same method and the same information, and the information and the method for generating the electronic signatures may be shared in advance with the client system.

Meanwhile, the authenticator 470 may receive a request for information required for a service or a function performed by a client system together with a virtual address from the client system authenticated in each of the communication sessions. At this time, the authenticator 470 may compare the received virtual address with a virtual address stored in the storage 450 and provide the requested information to the client system when the received virtual address coincides with the stored virtual address.

For example, the authenticator 470 may receive an API call including a virtual address from a client system authenticated in each of the communication sessions, compare the received virtual address with the virtual address stored in the storage 450, and transmit an API call response to the client system when the received virtual address coincides with the stored virtual address.

In an exemplary embodiment of the present disclosure, the shared key generator 410, the authentication key generator 430, the storage 450, and the authenticator 470 may be implemented by a computing device including at least one processor and a computer-readable recording medium connected to the processor. The computer-readable recording medium may be inside or outside the processor and connected to the processor using various well-known means. The processor in the computing device may enable the computing device to operate according to an exemplary embodiment described in this specification. For example, the processor may execute an instruction stored in the computer-readable recording medium, and the instruction stored in the computer-readable recording medium may be configured to cause the computing device to perform operations according to an exemplary embodiment described in this specification when the instruction is executed by the processor.

Figure 5:
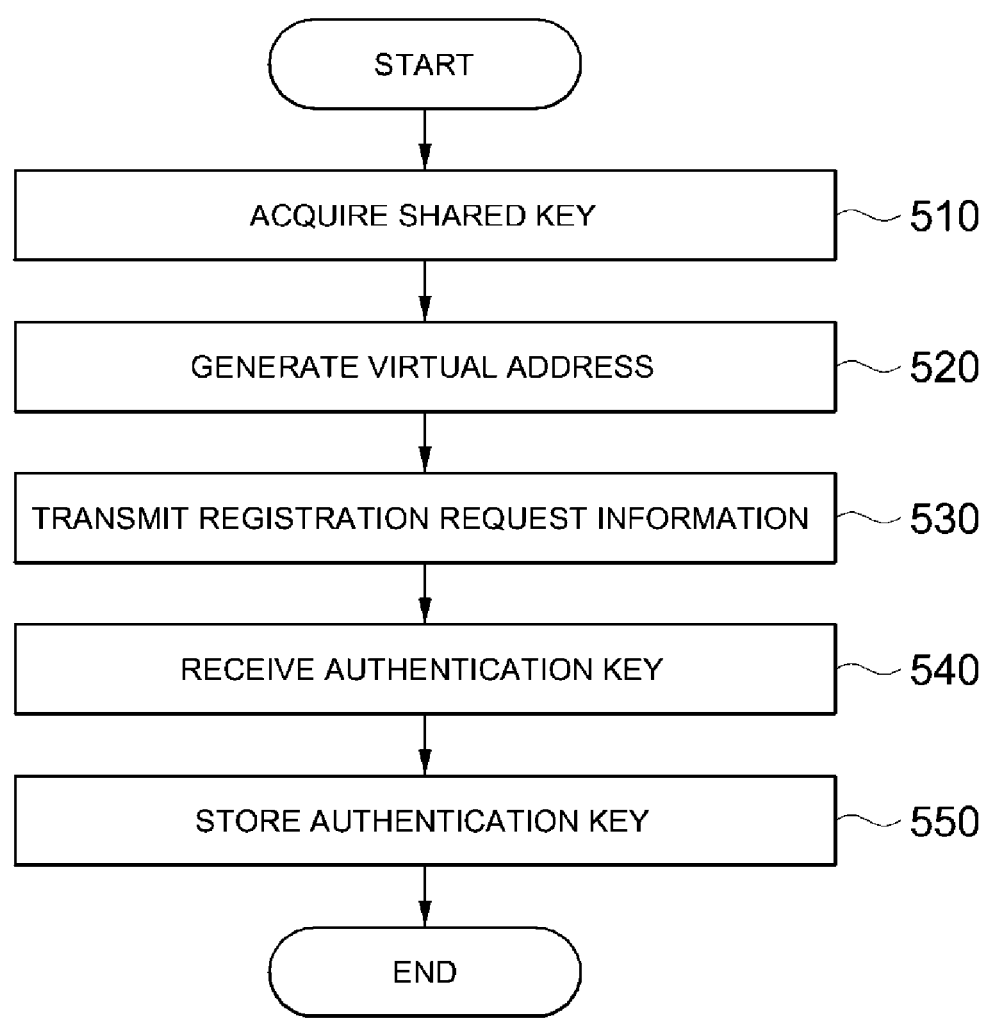
FIG. 5 is a flowchart illustrating a client system registration process performed by a client device according to an exemplary embodiment of the present disclosure.

FIG. 5 is a flowchart illustrating a client system registration process performed by a client device according to an exemplary embodiment of the present disclosure.

Each operation illustrated in FIG. 5 may be performed by, for example, the client device 200 shown in FIG. 2, and may be performed in an initial communication session between a client system and the authentication server 170.

Referring to FIG. 5, first, the client device 200 acquires a shared key for generating a virtual address of a client system in cooperation with the authentication server 170 (510).

At this time, according to an exemplary embodiment of the present disclosure, the client device 200 may exchange seed values with the authentication server 170 and generate the same shared key as the authentication server 170 using the exchanged seed values. In this case, the shared key may be, for example, a session key generated through the exchange of seed values with the authentication server 170.

According to another exemplary embodiment of the present disclosure, the client device 200 may request a shared key from the authentication server 170 and receive a shared key generated by the authentication server 170. In this case, the shared key may be, for example, a public key of the authentication server 170.

Subsequently, the client device 200 generates a virtual address of the client system using the acquired shared key (520).

Subsequently, the client device 200 transmits registration request information including the generated virtual address to the authentication server 170 (530).

Here, according to an exemplary embodiment of the present disclosure, the registration request information may include identification information of the client system as well as the virtual address.

At this time, the client device 200 may encrypt the registration request information using the session key, and the session key may be identical to the shared key according to an exemplary embodiment.

Subsequently, the client device 200 receives an authentication key for the client system from the authentication server 170 (540).

Subsequently, the client device 200 stores the received authentication key (550).

Here, the authentication key may be encrypted using the session key and received by the client device 200. In this case, the client device 200 may decrypt the received authentication key using the session key and then store the decrypted authentication key.

Figure 6:
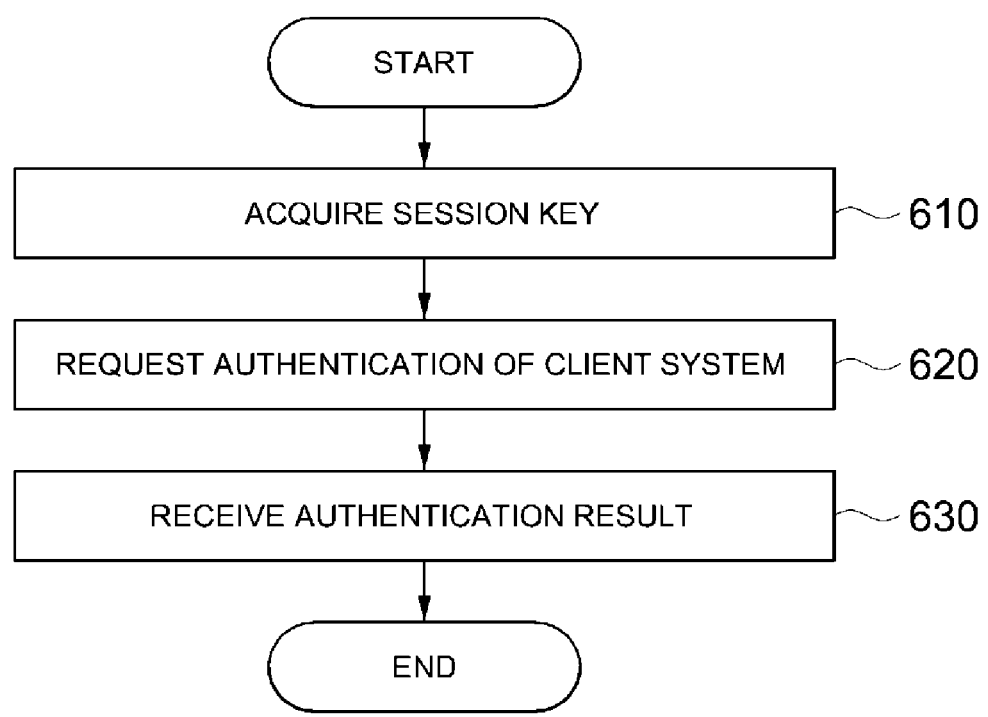
FIG. 6 is a flowchart illustrating a client system authentication process performed by a client device according to an exemplary embodiment of the present disclosure.

FIG. 6 is a flowchart illustrating a client system authentication process performed by a client device according to an exemplary embodiment of the present disclosure.

Each operation illustrated in FIG. 6 may be performed by, for example, the client device 200 shown in FIG. 2, and may be performed in each communication session between a client system and the authentication server 170 after the client system is registered in an initial communication session with the authentication server 170.

Referring to FIG. 6, the client device 200 requests a session key from the authentication server 170 and acquires a session key to be used in a current communication session between a client system and the authentication server 170 (610).

Subsequently, the client device 200 requests that the client system be authenticated by transmitting an authentication key for the client system and authentication request information including at least one of a virtual address and identification information of the client system to the authentication server 170 (620).

At this time, the client device 200 may encrypt the authentication request information and the authentication key using the session key and then transmit the encrypted authentication request information and authentication key.

Subsequently, the client device 200 receives a result of authenticating the client system from the authentication server 170 (630).

Figure 7:
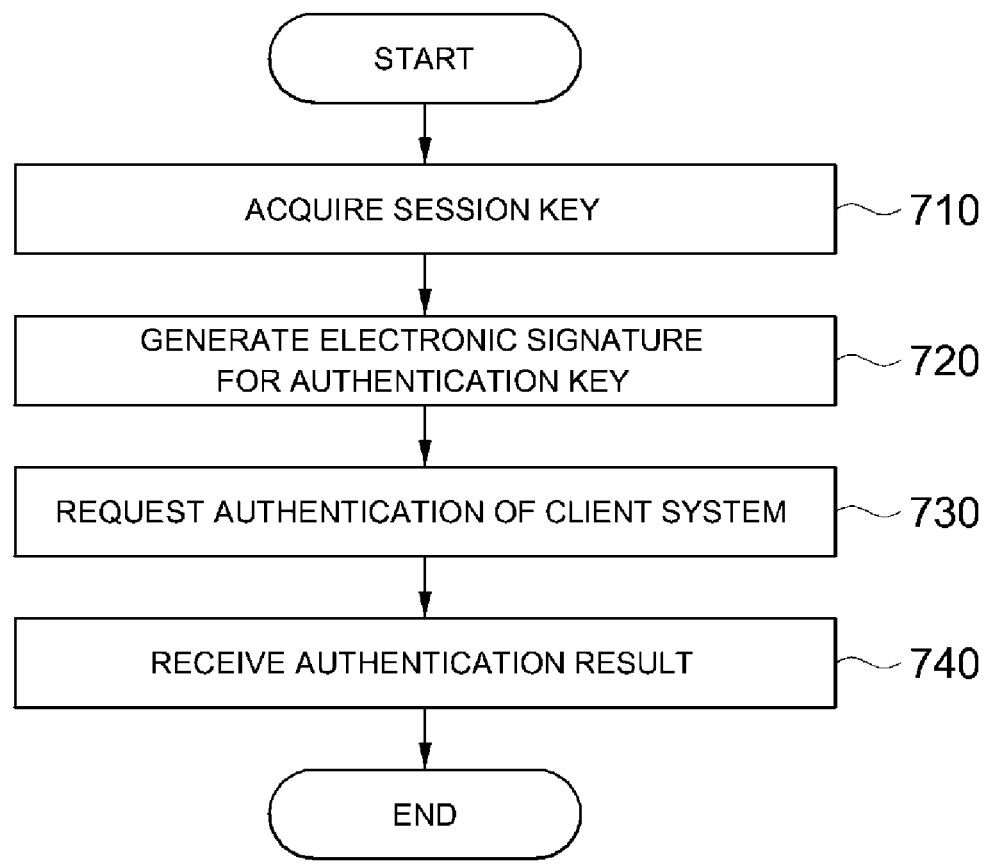
FIG. 7 is a flowchart illustrating a client system authentication process performed by a client device according to an additional exemplary embodiment of the present disclosure.

FIG. 7 is a flowchart illustrating a client system authentication process performed by a client device according to an additional embodiment of the present disclosure.

Each operation illustrated in FIG. 7 may be performed by, for example, the client device 200 shown in FIG. 2, and may be performed in each communication session between a client system and the authentication server 170 after the client system is registered in an initial communication session with the authentication server 170.

Referring to FIG. 7, the client device 200 requests a session key from the authentication server 170 and acquires a session key to be used in a current communication session between the client system and the authentication server 170 (710).

Subsequently, the client device 200 generates an electronic signature for an authentication key for the client system (720).

At this time, the electronic signature may be generated using, for example, the session key acquired in operation 710 and at least one of the authentication key, a virtual address, identification information of the client system which is provided to the authentication server 170.

Subsequently, the client device 200 requests that the client system be authenticated by transmitting the authentication key for the client system, an electronic signature for the authentication key, and authentication request information including at least one of the virtual address and identification information of the client system to the authentication server 170 (730).

At this time, the client device 200 may encrypt the authentication request information and the authentication key using the session key acquired in operation 710 and then transmit the encrypted authentication request information and authentication key.

Subsequently, the client device 200 receives a result of authenticating the client system from the authentication server 170 (740).

Figure 8:
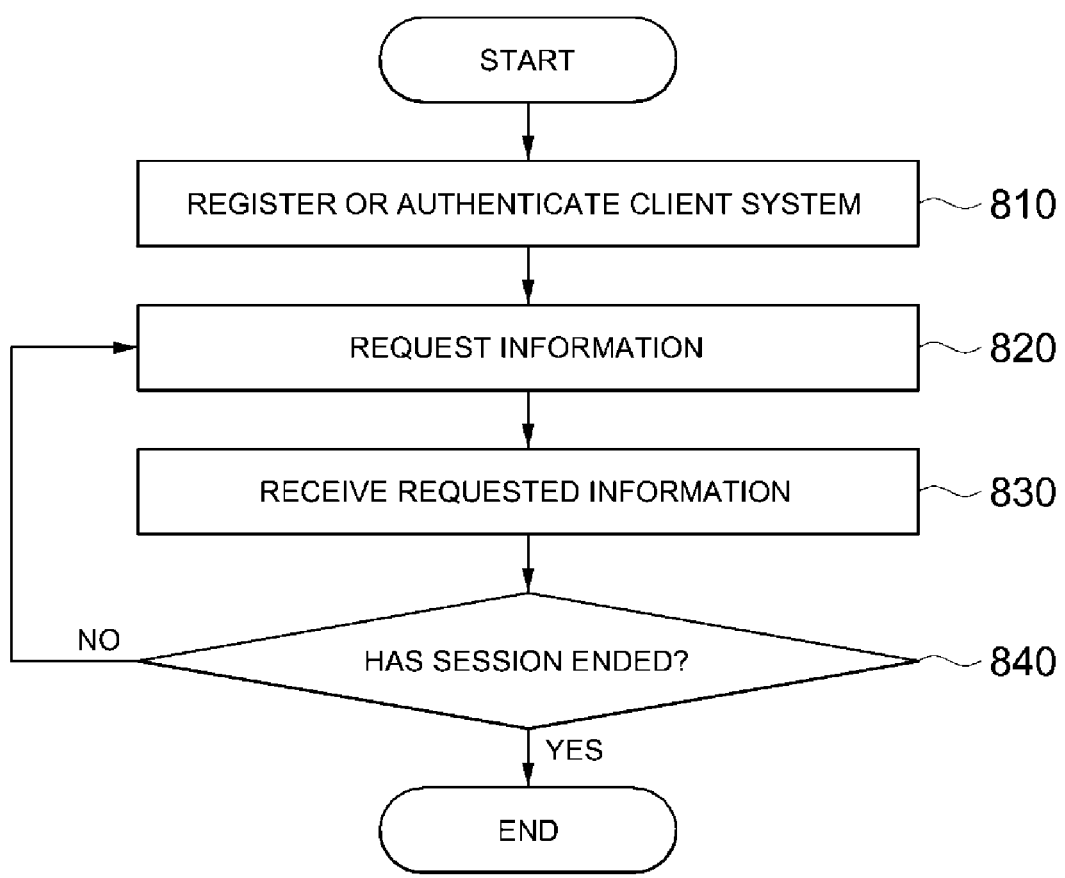
FIG. 8 is a flowchart illustrating a process in which a client device requests information required for a service or a function performed by a client system according to an exemplary embodiment of the present disclosure.

FIG. 8 is a flowchart illustrating a process in which the client device 200 requests information required for a service or a function performed by a client system according to an exemplary embodiment of the present disclosure.

Each operation illustrated in FIG. 8 may be performed by, for example, the client device 200 shown in FIG. 2, and may be performed in each communication session between the client system and the authentication server 170.

Referring to FIG. 8, the client device 200 performs registration or authentication of the client system through the authentication server 170 (810).

For example, when a current communication session is an initial communication session between the client system and the authentication server 170, operations 510 to 550 illustrated in FIG. 5 may be performed.

Also, when the current communication session is a communication session after the initial communication session between the client system and the authentication server 170, operations 610 to 630 illustrated in FIG. 6 or operations 710 to 740 illustrated in FIG. 7 may be performed.

Subsequently, the client device 200 requests information required for the client system to provide a function or a service by transmitting a virtual address of the client system to the authentication server 170 (820).

Subsequently, the client device 200 receives the requested information from the authentication server 170 (830).

For example, when calling an API provided by the authentication server 170, the client device 200 may transmit the virtual address and receive an API response from the authentication server 170.

Subsequently, the client device 200 determines whether the communication session between the client system and the authentication server 170 has ended (840) and may repeat operations 820 and 830 when the communication session is maintained.

Conversely, when the communication session has ended, the client device 200 may perform operations 810 to 840 in the next communication session between the client system and the authentication server 170.

Figure 9:
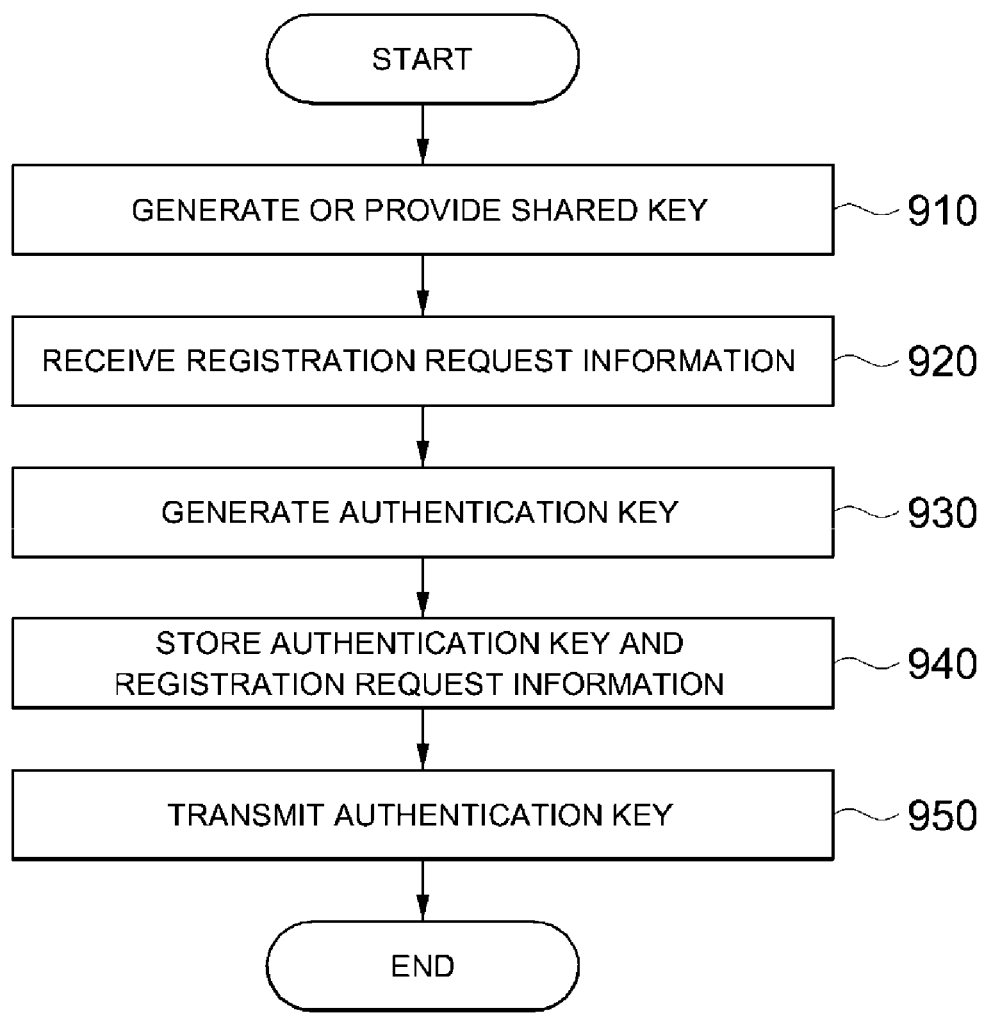
FIG. 9 is a flowchart illustrating a client system registration process performed by an authentication server according to an exemplary embodiment of the present disclosure.

FIG. 9 is a flowchart illustrating a client system registration process performed by an authentication server according to an exemplary embodiment of the present disclosure.

Each operation illustrated in FIG. 9 may be performed by, for example, the authentication server 400 shown in FIG. 4 and may be performed in an initial communication session with the client system.

Referring to FIG. 9, first, the authentication server 400 generates or provides a shared key for generating a virtual address of a client system installed in the client device 110, 130, or 150 in cooperation with the client device 110, 130, or 150 (910).

At this time, according to an exemplary embodiment of the present disclosure, the authentication server 400 may exchange seed values with the client device 110, 130, or 150 and generate the same shared key as the client device 110, 130, or 150 using the exchanged seed values. In this case, the shared key may be, for example, a session key generated through the exchange of seed values with the client device 110, 130, or 150.

According to another exemplary embodiment of the present disclosure, the authentication server 400 may generate a shared key according to a shared key request of the client device 110, 130, or 150 and provide the shared key to the client device 110, 130, or 150. For example, the authentication server 400 may receive a shared key request from the client device 110, 130, or 150, generate a public key and a private key of the authentication server 400, and provide the generated public key as a shared key to the client device 110, 130, or 150.

Subsequently, the authentication server 400 receives registration request information including a virtual address of the client system from the client device 110, 130, or 150 (920).

Here, the virtual address may be encrypted using the session key and received by the authentication server 400. In this case, the authentication server 400 may decrypt the received authentication key using the session key.

According to an exemplary embodiment, the session key may be identical to the shared key.

Also, according to an exemplary embodiment, the registration request information may further include identification information of the client system.

Subsequently, the authentication server 400 generates an authentication key for the client system using the received registration request information (930).

Subsequently, the authentication server 400 stores the registration request information as authentication information of the client system in connection with the authentication key (940).

Subsequently, the authentication server 400 provides the generated authentication key to the client device 110, 130, or 150 (950).

At this time, the authentication server 400 may encrypt the authentication key using the session key and then transmit the encrypted authentication key.

Figure 10:
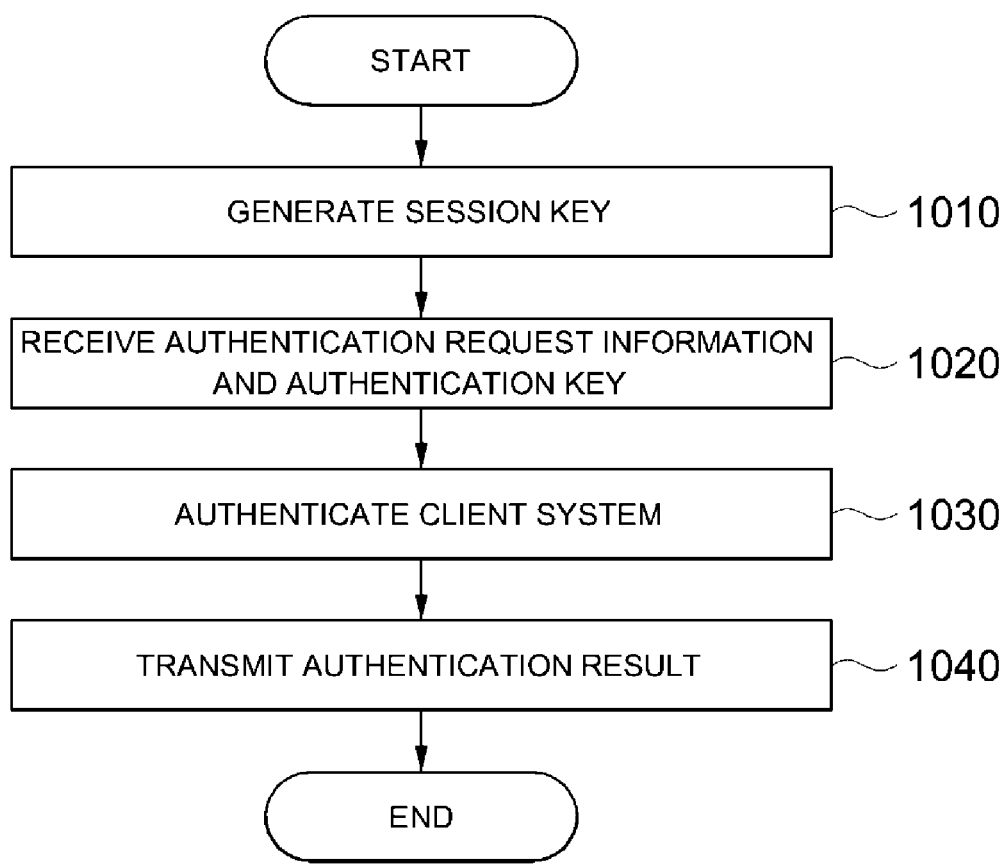
FIG. 10 is a flowchart illustrating a client system authentication process performed by an authentication server according to an exemplary embodiment of the present disclosure.

FIG. 10 is a flowchart illustrating a client system authentication process performed by an authentication server according to an exemplary embodiment of the present disclosure.

Each operation illustrated in FIG. 10 may be performed by, for example, the authentication server 400 shown in FIG. 4, and may be performed in each communication session with the client system after the client system is registered in an initial communication session with the client system.

Referring to FIG. 10, the authentication server 400 generates a session key to be used in a current communication session with the client system (1010).

Subsequently, the authentication server 400 receives an authentication key for the client system and authentication request information including at least one of a virtual address and identification information of the client system from the client device 110, 130, or 150 (1020).

Here, the authentication request information and the authentication key may be encrypted using the session key and received. In this case, the authentication server 400 may decrypt the received authentication request information and authentication key using the session key.

Subsequently, the authentication server 400 authenticates the client system by comparing the received authentication request information and authentication key with authentication information and an authentication key stored in connection with each other (1030).

Subsequently, the authentication server 400 transmits a result of authenticating the client system to the client device 110, 130, or 150 (1040).

Figure 11:
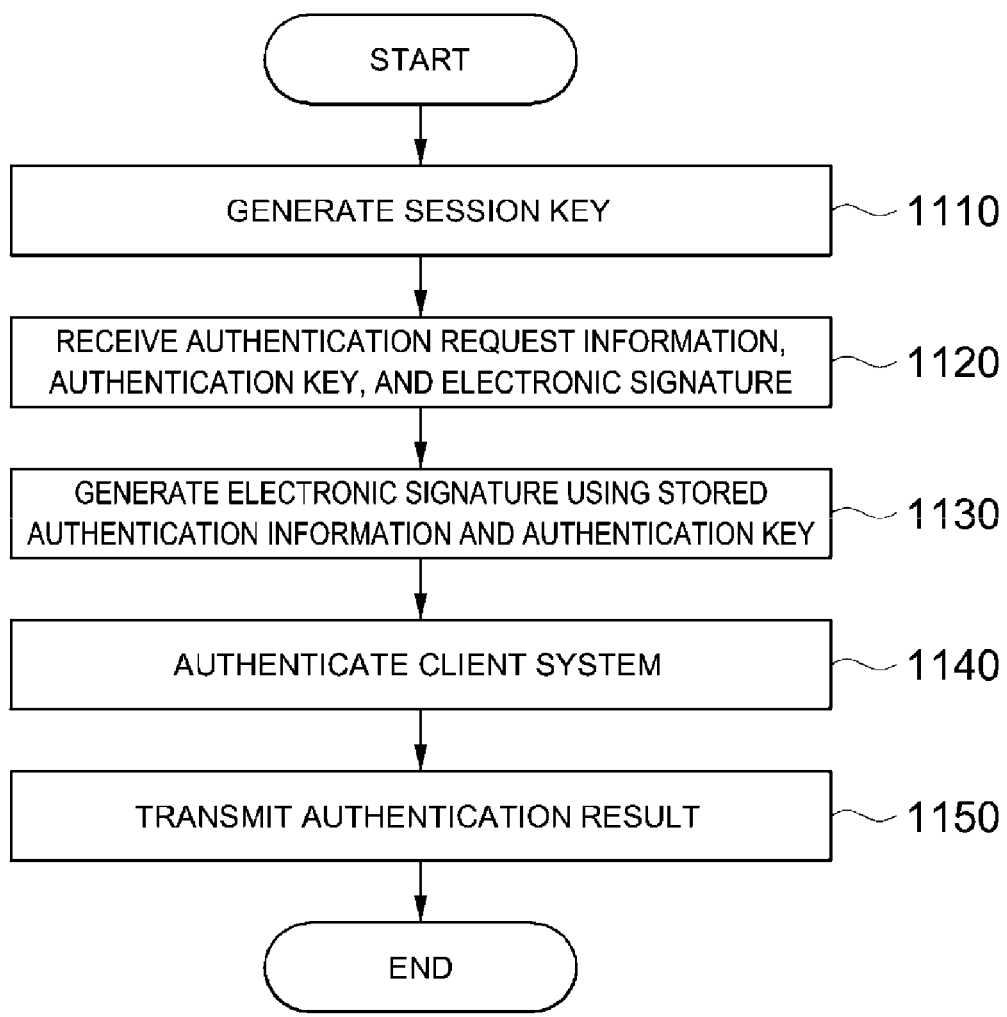
FIG. 11 is a flowchart illustrating a client system authentication process performed by an authentication server according to an additional exemplary embodiment of the present disclosure.

FIG. 11 is a flowchart illustrating a client system authentication process performed by an authentication server according to an additional embodiment of the present disclosure.

Each operation illustrated in FIG. 11 may be performed by, for example, the authentication server 400 shown in FIG. 4, and may be performed in each communication session with a client system after the client system is registered in an initial communication session with the client system.

Referring to FIG. 11, the authentication server 400 generates a session key to be used in a current communication session with the client system (1110).

Subsequently, the authentication server 400 receives authentication request information including a virtual address of the client system, an authentication key for the client system, and an electronic signature for the authentication key from the client device 110, 130, or 150 (1120).

Here, the authentication request information and the authentication key may be encrypted using the session key and received by the authentication server 400. In this case, the authentication server 400 may decrypt the received authentication request information and authentication key using the session key.

Subsequently, the authentication server 400 generates an electronic signature using stored authentication information and a stored authentication key for the client system (1130).

Here, the electronic signature generated by the authentication server 400 and the received electronic signature are generated using the same method and the same information, and the information and the method for generating the electronic signatures may be shared in advance with the client system.

Subsequently, the authentication server 400 verifies the received electronic signature by comparing the received electronic signature with the generated electronic signature and authenticates the client system by comparing the received authentication request information and authentication key with the stored authentication information and authentication key (1140).

Subsequently, the authentication server 400 transmits a result of authenticating the client system to the client device 110, 130, or 150 (1150).

Figure 12:
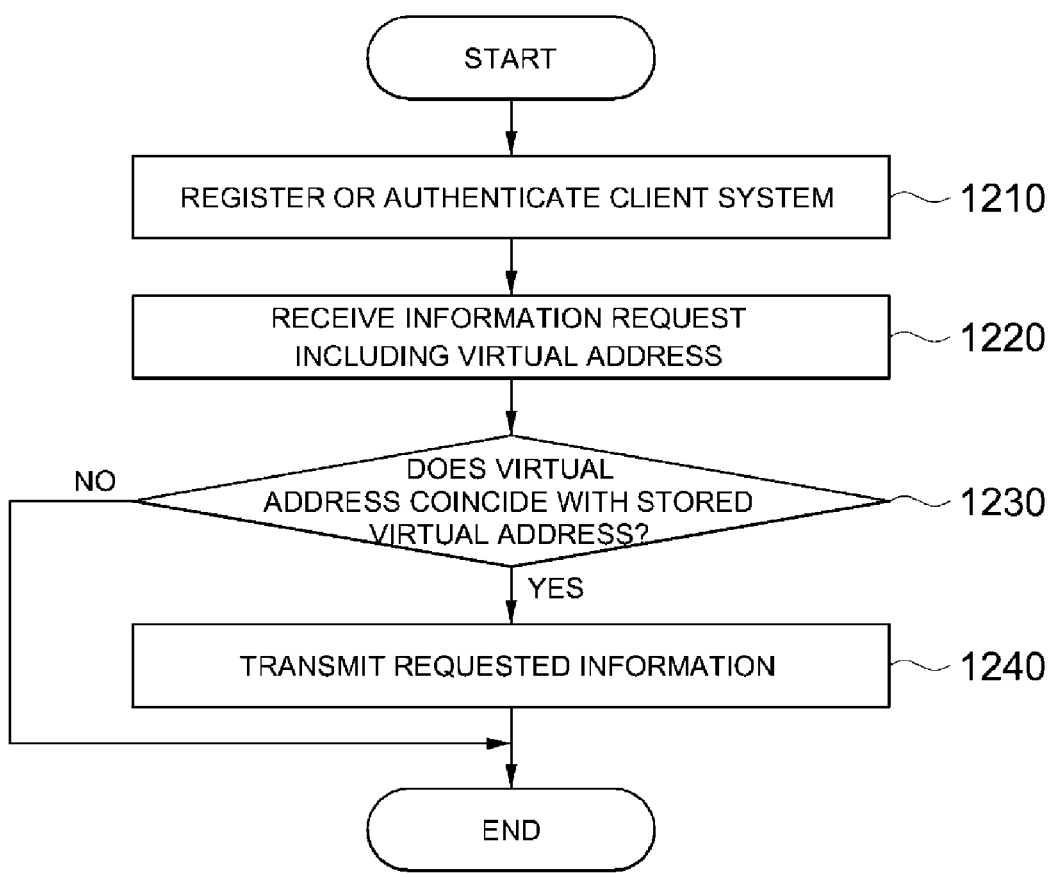
FIG. 12 is a flowchart illustrating a process in which an authentication server processes an information request received from a client system according to an exemplary embodiment of the present disclosure.

FIG. 12 is a flowchart illustrating a process in which an authentication server processes an information request received from a client system according to an exemplary embodiment of the present disclosure.

Each operation illustrated in FIG. 12 may be performed by, for example, the authentication server 400 shown in FIG. 4, and may be performed in each communication session with a client system.

Referring to FIG. 12, the authentication server 400 registers or authenticates the client system (1210).

For example, when a current communication session is an initial communication session with the client system, operations 910 to 950 illustrated in FIG. 9 may be performed.

Also, when the current communication session is a communication session after the initial communication session with the client system, operations 1010 to 1040 illustrated in FIG. 10 or operations 1110 to 1150 illustrated in FIG. 11 may be performed.

Subsequently, the authentication server 400 receives a virtual address of the client system and a request for information required for a service or a function performed by the client system (1220).

Subsequently, the authentication server 400 determines whether the received virtual address coincides with a stored virtual address by comparing the addresses (1230) and transmits the requested information to the client device 110, 130, or 150 when the received virtual address coincides with the stored virtual address (1240).

Although the flowcharts of FIGS. 5 to 12 illustrate the methods as a plurality of separate operations, at least some of the operations may be performed in a different order, performed in combination with other operations, skipped, or divided into sub-operations and performed, or one or more operations not shown may be additionally performed.

Embodiments of the present disclosure may include a computer-readable recording medium including a program for performing methods described in this specification on a computer. The computer-readable recording medium may include a program instruction, a local data file, a local data structure, and the like alone or in combination. The medium may be designed and configured specially for the present disclosure or may be generally available in the field of computer software. Examples of the computer-readable recording medium include magnetic media, such as a hard disk, a floppy disk, and a magnetic tape, optical recording media, such as a compact disc read-only memory (CD-ROM) and a digital versatile disc (DVD), magneto-optical media, such as a floptical disk, and hardware devices, such as a ROM, a random access memory (RAM), a flash memory, etc. specially configured to store and execute a program instruction. Examples of the program instruction a high-level language code executable by a computer using an interpreter or the like as well as a machine language code made by a compiler.

According to exemplary embodiments of the present disclosure, a virtual address of a client system is provided to an authentication server to register the client system with the authentication server so that the authentication server automatically issues an authentication key for authenticating the client system. Therefore, it is possible to safely authenticate a client system through an authentication key and a virtual address.

Further, according to exemplary embodiments of the present disclosure, a virtual address for uniquely identifying a client system is generated and used to register and authenticate the client system. Therefore, even when a plurality of client systems do not have separate pieces of identification information for uniquely identifying them, it is possible to distinguish and authenticate the client systems.

Although exemplary embodiments of the present disclosure have been described in detail above, it should be understood by those of ordinary skill in the art that various changes may be made without departing from the scope of the present disclosure. Therefore, the scope of the present disclosure is to be determined by the following claims and their equivalents, and is not restricted or limited by the foregoing detailed description.

What is claimed is:

1. A client system authentication method performed by a client device in which a client system is installed, the method comprising:
   acquiring a shared key to be shared between the client system and an authentication server;
   generating a virtual address of the client system using a hash value of identification information of the client system, a hash value of the shared key, a checksum value of the hash value of the identification information, and a checksum value of the hash value of the shared key;
   transmitting registration request information including the virtual address to the authentication server; and
   receiving, from the authentication server, an authentication key for the client system generated using the registration request information.

2. The client system authentication method of claim 1, wherein the identification information includes at least one of a code of the client system, a domain name assigned to the client system, and an Internet Protocol (IP) address assigned to the client system.

3. The client system authentication method of claim 1, further comprising, when the authentication key is received, requesting information for a service or a function performed by the client system by transmitting the virtual address to the authentication server.

4. The client system authentication method of claim 1, further comprising requesting authentication of the client system by transmitting the authentication key and authentication request information to the authentication server, the authentication request information including at least one of the virtual address and the identification information.

5. The client system authentication method of claim 4, wherein the requesting the authentication comprises:
 generating an electronic signature for the authentication key; and
 requesting the authentication of the client system by providing the authentication key, the electronic signature, and the authentication request information including the at least one of the virtual address and the identification information, to the authentication server.

6. The client system authentication method of claim 4, further comprising:
 receiving an authentication result corresponding to an authentication request from the authentication server; and
 when the authentication of the client system has succeeded, requesting information for a service or a function performed by the client system by transmitting the virtual address to the authentication server.

7. A client system authentication method performed by an authentication server, the method comprising:
 generating or providing a shared key to be shared between a client system installed in a client device and the authentication server;
 receiving, from the client device, registration request information including a first virtual address of the client system generated using a hash value of identification information of the client system, a hash value of the shared key, a checksum value of the hash value of the identification information, and a checksum value of the hash value of the shared key;
 generating an authentication key for the client system using the registration request information;
 storing the registration request information as authentication information of the client system in connection with the authentication key; and
 providing the authentication key to the client device.

8. The client system authentication method of claim 7, wherein the identification information includes at least one of a code of the client system, a domain name assigned to the client system, and an Internet Protocol (IP) address assigned to the client system.

9. The client system authentication method of claim 7, further comprising:
 after the providing of the authentication key, receiving a second virtual address and a request for information for a service or a function performed by the client system from the client device;
 determining whether the second virtual address and the first virtual address stored as the authentication information are identical by comparing the second virtual address and the first virtual address; and
 when the second virtual address and the first virtual address are identical, providing the requested information to the client device.

10. The client system authentication method of claim 7, further comprising:
 receiving the authentication key and authentication request information from the client device, the authentication request information including at least one of the first virtual address and the identification information;
 authenticating the client system by comparing the received authentication request information with the stored authentication information; and
 providing a result of the authentication to the client device.

11. The client system authentication method of claim 10, further comprising:
 when the authentication of the client system has succeeded, receiving a second virtual address and a request for information for a service or a function performed by the client system;
 determining whether the second virtual address and the first virtual address stored as the authentication information are identical by comparing the second virtual address and the first virtual address; and
 when the second virtual address and the first virtual address are identical, providing the requested information to the client device.

12. The client system authentication method of claim 7, further comprising:
 receiving the authentication key, a first electronic signature for the authentication key, and authentication request information including at least one of the first virtual address and the identification information from the client device;
 generating a second electronic signature using the stored authentication information and the authentication key;
 verifying the first electronic signature by comparing the first electronic signature and the second electronic signature;
 authenticating the client system by comparing the received authentication request information with the stored authentication information; and
 providing a result of the authentication to the client device.

13. A client device comprising:
 at least one hardware processor configured to execute:
 a shared key acquirer configured to acquire a shared key to be shared between a client system and an authentication server;
 a virtual address generator configured to generate a virtual address of the client system using a hash value of identification information of the client system, a hash value of the shared key, a checksum value of the hash value of the identification information, and a checksum value of the hash value of the shared key;
 an authentication requester configured to transmit registration request information including the virtual address to the authentication server and receive, from the authentication server, an authentication key for the client system generated using the registration request information; and
 a memory configured to store the virtual address and the authentication key.

14. The client device of claim 13, wherein the identification information includes at least one of a code of the client system, a domain name assigned to the client system and an Internet Protocol (IP) address assigned to the client system.

15. The client device of claim 13, wherein, when the authentication key is received, the authentication requester requests information for a service or a function performed by the client system by transmitting the virtual address to the authentication server.

16. The client device of claim 13, wherein the authentication requester is further configured to request that the client system be authenticated by transmitting the authentication key and authentication request information to the authentication server, the authentication request information including at least one of the virtual address and the identification information.

17. The client device of claim 16, wherein the authentication requester is further configured to:
generate an electronic signature for the authentication key; and
request that the client system be authenticated by providing the authentication key, the electronic signature, and the authentication request information including the at least one of the virtual address and the identification information to the authentication server.

18. The client device of claim 16, wherein the authentication requester is further configured to:
receive an authentication result corresponding to an authentication request from the authentication server; and
request information for a service or a function performed by the client system by transmitting the virtual address to the authentication server when the authentication of the client system has succeeded.

19. An authentication server comprising:
at least one hardware processor configured to execute:
a session key generator configured to generate or provide a shared key to be shared with a client system installed in a client device;
an authentication key generator configured to receive, from the client device, registration request information including a first virtual address of the client system generated using a hash value of identification information of the client system, a hash value of the shared key, a checksum value of the hash value of the identification information, and a checksum value of the hash value of the shared key, generate an authentication key for the client system using the registration request information, and provide the authentication key to the client device; and
a memory configured to store the registration request information as authentication information of the client system in connection with the authentication key.

20. The authentication server of claim 19, wherein the identification information includes at least one of a code of the client system, a domain name assigned to the client system and an Internet Protocol (IP) address assigned to the client system.

21. The authentication server of claim 19, further comprising an authenticator configured to:
receive the authentication key and authentication request information including at least one of the first virtual address and the identification information from the client device; and
authenticate the client system by comparing the received authentication request information with the stored authentication information.

22. The authentication server of claim 21, wherein the authenticator is further configured to:
receive the authentication key, a first electronic signature for the authentication key, and the authentication request information including the at least one of the first virtual address and the identification information from the client device,
generate a second electronic signature using the stored authentication information and the authentication key,
verify the first electronic signature by comparing the first electronic signature and the second electronic signature, and
authenticate the client system by comparing the received authentication request information with the stored authentication information.

23. The authentication server of claim 21, wherein, after the authentication key is provided, the authenticator is further configured to:
receive a second virtual address and a request for information for a service or a function performed by the client system from the client device,
determine whether the second virtual address and the first virtual address stored as the authentication information are identical by comparing the second virtual address and the first virtual address, and
provide the requested information to the client device when the second virtual address and the first virtual address are identical.

24. The authentication server of claim 21, wherein, after the authentication succeeds, the authenticator is further configured to:
receive a second virtual address and a request for information for a service or a function performed by the client system,
determine whether the second virtual address and the first virtual address stored as the authentication information are identical by comparing the second virtual address and the first virtual address, and
provide the requested information to the client device when the second virtual address and the first virtual address are identical.

* * * * *